US010652521B2

United States Patent
Itoh et al.

(10) Patent No.: US 10,652,521 B2
(45) Date of Patent: May 12, 2020

(54) STEREO CAMERA AND IMAGE PICKUP SYSTEM

(71) Applicant: Hitachi, Ltd., Chiyoda-ku, Tokyo (JP)

(72) Inventors: Masaya Itoh, Tokyo (JP); Yuan Li, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 23 days.

(21) Appl. No.: 16/072,707

(22) PCT Filed: Jan. 5, 2017

(86) PCT No.: PCT/JP2017/000131
§ 371 (c)(1),
(2) Date: Jul. 25, 2018

(87) PCT Pub. No.: WO2017/130650
PCT Pub. Date: Aug. 3, 2017

(65) Prior Publication Data
US 2019/0037205 A1 Jan. 31, 2019

(30) Foreign Application Priority Data
Jan. 26, 2016 (JP) .................. 2016-012205

(51) Int. Cl.
*H04N 13/246* (2018.01)
*G03B 35/08* (2006.01)
(Continued)

(52) U.S. Cl.
CPC .......... *H04N 13/246* (2018.05); *G02B 7/023* (2013.01); *G03B 35/08* (2013.01); *H04N 5/2258* (2013.01);
(Continued)

(58) Field of Classification Search
CPC ............ H04N 13/246; H04N 5/23299; H04N 13/239; H04N 5/2258; H04N 5/23296; H04N 17/002; G02B 7/023; G03B 35/08
See application file for complete search history.

(56) References Cited

U.S. PATENT DOCUMENTS

| 2013/0038700 A1* | 2/2013 | Horita | .................. G02B 7/36 348/47 |
| 2013/0265442 A1* | 10/2013 | Maekawa | ............ H04N 17/002 348/187 |

(Continued)

FOREIGN PATENT DOCUMENTS

| JP | 2004-242049 A | 8/2004 |
| JP | 2011-176868 A | 9/2011 |

(Continued)

OTHER PUBLICATIONS

International Search Report (PCT/ISA/210) issued in PCT Application No. PCT/JP2017/000131 dated Mar. 7, 2017 with English translation (four (4) pages).

(Continued)

*Primary Examiner* — Tat C Chio
(74) *Attorney, Agent, or Firm* — Crowell & Moring LLP (57) ABSTRACT

Provided is an imaging system such as a stereo camera which includes a mechanism capable of controlling a camera setting such as zooming or panning/tilting, wherein the stereo camera and the imaging system maintains measurement accuracy of the imaging system even when the camera setting is changed. The stereo camera including at least two cameras estimates camera parameters of the camera when a lens position of the camera is changed by an operation instruction of the camera. In addition, the imaging system includes at least two cameras, a camera control unit which controls at least a lens position of the camera, a calibration unit which estimates camera parameters of the camera when at least the lens position of the camera is moved by the camera control unit, and an image recognition unit which performs three-dimensional restoration of captured images of the cameras based on the camera parameters.

15 Claims, 8 Drawing Sheets

(51) Int. Cl.
*H04N 13/239* (2018.01)
*H04N 17/00* (2006.01)
*H04N 5/225* (2006.01)
*H04N 5/232* (2006.01)
*G02B 7/02* (2006.01)

(52) U.S. Cl.
CPC ..... *H04N 5/23296* (2013.01); *H04N 5/23299* (2018.08); *H04N 13/239* (2018.05); *H04N 17/002* (2013.01)

(56) References Cited

U.S. PATENT DOCUMENTS

2016/0188994 A1* 6/2016 Wu .................. G06T 7/593
                                                   382/195
2016/0225158 A1   8/2016 Tsubota et al.

FOREIGN PATENT DOCUMENTS

| JP | 2013-162416 A | 8/2013 |
| JP | 2014-175782 A | 9/2014 |
| JP | 2015-226209 A | 12/2015 |
| JP | 2016-213535 A | 12/2016 |
| WO | WO 2011/132552 A1 | 10/2011 |

OTHER PUBLICATIONS

Japanese-language Written Opinion (PCT/ISA/237) issued in PCT Application No. PCT/JP2017/000131 dated Mar. 7, 2017 (five (5) pages).

Japanese-language Office Action issued in counterpart Japanese Application No. 2016-012205 dated Oct. 8, 2019 with English translation (10 pages).

* cited by examiner

| LENS POSITION | FOCAL LENGTH | SCALE | OFFSET | ESTIMATED CAMERA PARAMETER |
|---|---|---|---|---|
| l1 | f1 mm | s1 | o1 | parm1 |
| l2 | f2 mm | s2 | o2 | Parm2 |
| ... | ... | ... | ... | ... |

STEREO CAMERA AND IMAGE PICKUP SYSTEM

TECHNICAL FIELD

The present invention relates to camera calibration and a camera control method in a stereo camera and an imaging system.

BACKGROUND ART

There is a stereo camera which records information in a depth direction of an object by capturing the object from plural different directions as an apparatus or a system for performing three-dimensional measurement of an object and capturing of a three-dimensional image.

Some stereo cameras or imaging systems which include plural imaging devices to perform three-dimensional measurement processing include zoom lenses. PTL 1 discloses a technique for performing zoom control suitable for three-dimensional measurement when distance measurement of a subject is performed in a stereo imaging apparatus including a zoom lens.

Specifically, PTL 1 discloses a technique in which it is possible to transmit control data corresponding to an operation of a monitoring person to a stereo imaging control unit so that zoom control of an imaging unit and pan control and tilt control of the imaging unit can be performed according to the control data by the stereo imaging control unit, and further capturing is performed at arbitrary focal length, that is, an angle of view, and a field of view, that is, a picture frame, without causing frame-out.

CITATION LIST

Patent Literature

PTL 1: JP-A-2011-176868

SUMMARY OF INVENTION

Technical Problem

According to the prior art described above, a stereo camera can monitor a three-dimensional shape with an angle of view, a field of view, and detection accuracy depending on a subject.

However, it is not considered that a zoom mechanism or a pan/tilt mechanism of the stereo camera is influenced from various environments, resulting in deviation from the factory shipment. Therefore, the accuracy of a monitoring result may deteriorate depending on the environment or the passage of time.

Also, it is not considered that, when a stereo camera device is installed with a jig or the like, distortion may occur in a housing due to pressure at a contact surface, a material of the housing may expand or contract depending on temperature or the like, and mounting error may occur due to vibration or the like with the lapse of a long time.

Further, in a stereo camera or an imaging system including plural imaging devices, three-dimensional measurement or capturing of a three-dimensional image is performed based on imaging information of two cameras or plural imaging devices, and thus it is also necessary to consider the change in the characteristic difference of the imaging device.

The invention has been made to solve the problem described above and an object thereof is to maintain measurement accuracy of a stereo camera or an imaging system even when a camera setting changes in the imaging system such as a stereo camera including a mechanism capable of controlling the camera setting such as zooming or panning/tilting.

Solution to Problem

In order to solve the problem, a stereo camera including at least two cameras according to the invention estimates camera parameters of the camera when a lens position of the camera is changed by an operation instruction of the camera.

In addition, an imaging system according to the invention includes at least two cameras, a camera control unit which controls at least a lens position of the camera, a calibration unit which estimates camera parameters of the camera when at least the lens position of the camera is moved by the camera control unit, and an image recognition unit which performs three-dimensional restoration of captured images of the cameras based on the camera parameters.

Advantageous Effects of Invention

According to the invention, camera calibration can be dynamically executed, and thus it is possible to provide a stereo camera or an imaging system which does not degrade accuracy against changes due to aging or external factors of plural imaging devices of the stereo camera.

DESCRIPTION OF EMBODIMENTS

Hereinafter, a stereo camera of an embodiment will be described with reference to the drawings.

First, coordinate representation of an imaging system such as a stereo camera which calculates information on a depth direction of an object by capturing an object from plural different directions will be described. World coordinates (XW, YW, and ZW) and image coordinates (u, v) of an object can be expressed by the relationship of the following (Expression 1).

$$\lambda \begin{bmatrix} u \\ v \\ 1 \end{bmatrix} = KD \begin{bmatrix} X_w \\ Y_w \\ Z_w \\ 1 \end{bmatrix} \quad \text{[Expression 1]}$$

Here, λ is a constant, a parameter matrix K represents internal parameters of the camera, and a parameter matrix D represents external parameters of the camera.

Assuming that a focal length is f, an aspect ratio is a, a skew is s, and a center coordinate of the image coordinate is (uc, vc), the parameter matrix K is expressed as (Expression 2).

$$K = \begin{bmatrix} f & sf & v_c & 0 \\ 0 & af & u_c & 0 \\ 0 & 0 & 1 & 0 \end{bmatrix} \quad \text{[Expression 2]}$$

Further, the parameter matrix D is expressed as (Expression 3). (r11, r12, r13, r21, r22, r23, r31, r32, r33) of (Expression 3) represents an orientation (direction of an optical axis of a lens) of a camera and (tx, ty, tz) indicates the world coordinates of a camera installation position (lens center coordinates).

$$D = \begin{bmatrix} r_{11} & r_{12} & r_{13} & t_X \\ r_{21} & r_{22} & r_{23} & t_Y \\ r_{31} & r_{32} & r_{33} & t_Z \\ 0 & 0 & 0 & 1 \end{bmatrix} \quad \text{[Expression 3]}$$

Further, when (r11, r12, r13, r21, r22, r23, r31, r32, r33) indicating the camera orientation of an external parameters is defined by Euler angles, external parameters can be represented by three parameters of a pan θ, a tilt φ, and a roll ψ which are installation angles of a camera.

Therefore, the number of camera parameters necessary for associating the world coordinates (XW, YW, ZW) and the image coordinates (u, v) is eleven parameters obtained by summing up five internal parameters and six external parameters.

Meanwhile, in (Expression 3), the meaning of the camera parameter matrix D is invariable even when it is multiplied by a constant, and thus λ and the parameter matrices K and D may be arranged into one matrix and represented as the following (Expression 4).

$$\begin{bmatrix} u \\ v \\ 1 \end{bmatrix} = \begin{bmatrix} c_{11} & c_{12} & c_{13} & c_{14} \\ c_{21} & c_{22} & c_{23} & c_{24} \\ c_{31} & c_{32} & c_{33} & c_{34} \end{bmatrix} \begin{bmatrix} X_w \\ Y_w \\ Z_w \\ 1 \end{bmatrix} \quad \text{[Expression 4]}$$

Furthermore, when c34 is fixed to one in (Expression 4), the number of unknown parameters becomes eleven. To obtain these eleven parameters is synonymous with obtaining five internal parameters and six external parameters in (Expression 1).

As a result, (Expression 1) can be transformed as (Expression 5) and the matrix C in (Expression 5) becomes a camera parameter to be obtained at last.

$$\begin{bmatrix} u \\ v \\ 1 \end{bmatrix} = C \begin{bmatrix} X_w \\ Y_w \\ Z_w \\ 1 \end{bmatrix} \left( C = \begin{bmatrix} c_{11} & c_{12} & c_{13} & c_{14} \\ c_{21} & c_{22} & c_{23} & c_{24} \\ c_{31} & c_{32} & c_{33} & 1 \end{bmatrix} \right) \quad \text{[Expression 5]}$$

In order to calculate the camera parameter, a calibration method is devised. In general calibration, the position of a calibration pattern is captured from various directions and an optimal solution of internal parameters or external parameters is obtained by a comparison operation between an ideal appearance and an actually captured image so as to be the least square error, for example.

Representatively, camera parameters can be calculated by the "Zhang's method" (Z. Zhang, "A flexible new technique for camera calibration", IEEE Transactions on Pattern Analysis and Machine Intelligence, 22(11):1330-1334, 2000.).

When the zoom amount of the camera is changed, a focal length is changed, and thus the parameter matrix K described above is changed. Also, when the orientation of the camera is changed due to a pan/tilt motion of a camera, the parameter matrix D is changed. Therefore, it is necessary to perform calibration every time the setting of a camera related to the zoom or the pan/tilt is changed.

In the "Zhang s method" described above, a chart for calibration is used, and thus the operability of a camera is not good.

In the stereo camera or the imaging system of the embodiment, self-camera calibration is performed without a chart for calibration as described below.

Figure 1:
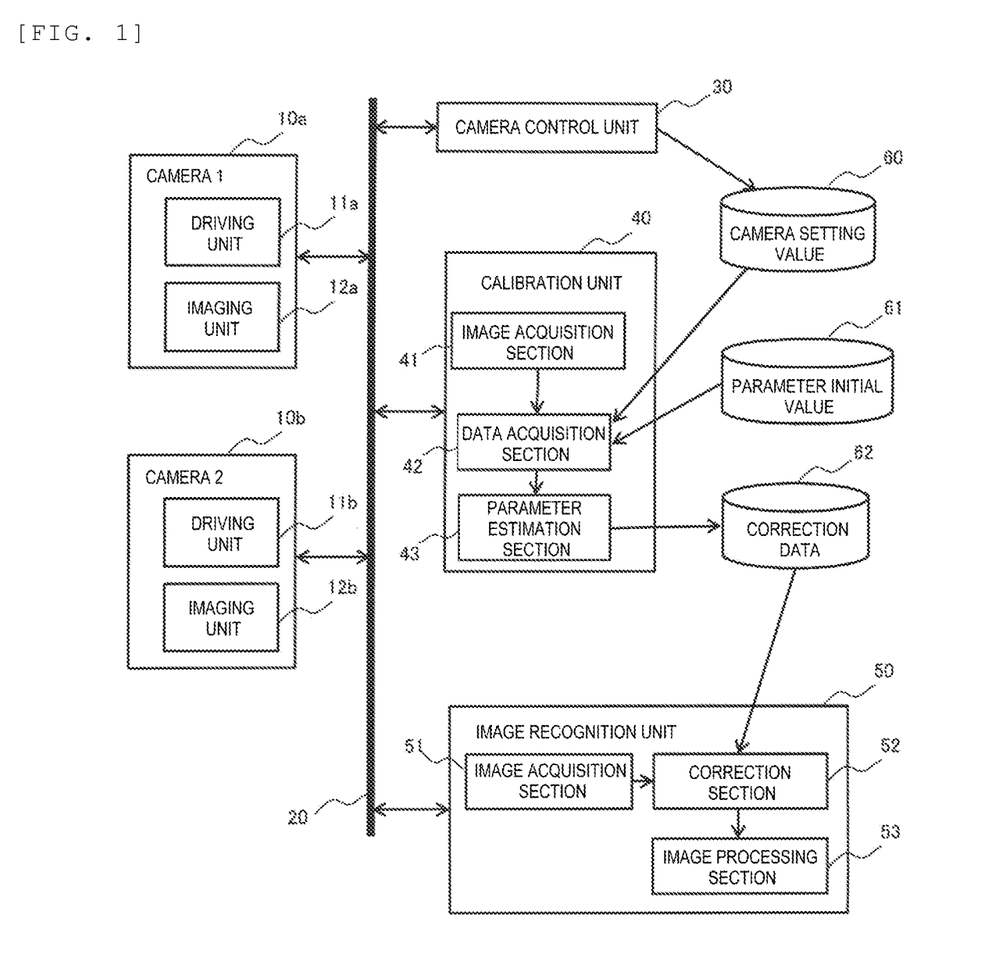
FIG. 1 is a diagram illustrating a configuration of a stereo camera according to an embodiment.

FIG. 1 is a diagram illustrating a configuration of the stereo camera according to the embodiment.

The stereo camera of the embodiment captures a measurement object or a measurement target area by two imaging devices of a camera 1 (10a) and a camera 2 (10b). In the stereo camera according to the embodiment, in particular, the detection target is not limited and it may be used for a method of detecting a moving object such as a person, a vehicle, a ship, a robot, or the like and a specific object.

Further, in the embodiment, a configuration constituted of the two imaging devices of the camera 1 (10a) and the camera 2 (10b) is described. However, the invention is not limited thereto and a configuration including plural imaging devices may be adopted.

Furthermore, the stereo camera of the embodiment is constituted of a camera control unit 30 for controlling the camera 1 (10a) and the camera 2 (10b), a calibration unit 40 for calculating camera parameters, and an image recognition unit 50 and includes a camera setting value storage unit 60, a parameter initial value storage unit 61, and a correction data storage unit 62.

In the stereo camera of the embodiment illustrated in FIG. 1, the camera 1 (10a), the camera 2 (10b), the camera control unit 30, the calibration unit 40, the image recognition unit 50, the camera setting value storage unit 60, the parameter initial value storage unit 61, and the correction data storage unit 62 are integrally formed. However, the invention is not limited thereto and the stereo camera may be constituted of the camera 1 (10a), the camera 2 (10b), and the camera control unit 30 and the calibration unit 40 and the image recognition unit 50 may be constituted by other information processing device.

Figure 3:
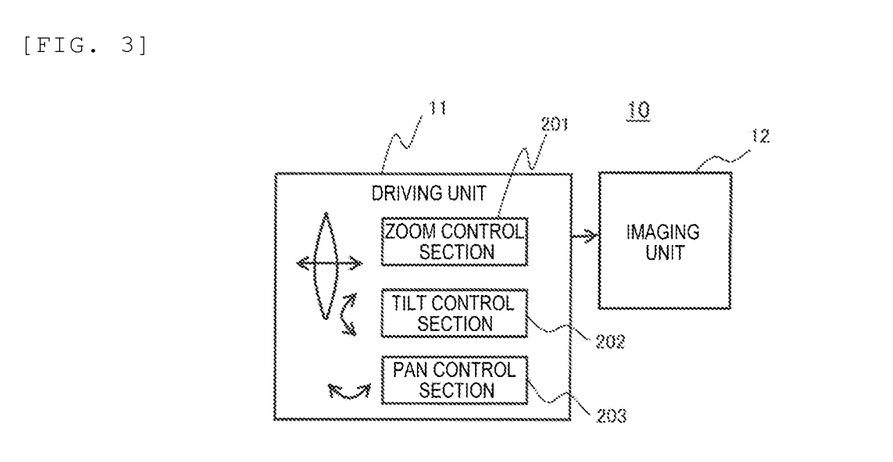
FIG. 3 is a diagram illustrating an internal configuration of the camera.

Next, the internal configuration of the camera 1 (10a) and the camera 2 (10b) (hereinafter, collectively referred to as a camera 10) will be described with reference to FIG. 3.

The camera 10 is constituted of a driving unit 11 which is a mechanism for controlling the orientation or the angle of view of the camera 10 and an imaging unit 12 provided with an image sensor such as a Complementary Metal Oxide Semiconductor (CMOS) and a Charge Coupled Device (CCD).

In the driving unit 11, a zoom control section 201 which drives a lens mechanism (not illustrated) of the imaging unit 12 to change a focal length by the movement of the lens and changes the angle of view which is the imaging range of a camera, a tilt control section 202 which controls a vertical orientation of the camera 10, and a pan control section 203 which controls a horizontal orientation of the camera 10 are provided.

As a result, it is possible for each camera 10 to perform image-capturing on a predetermined measurement object or measurement target area.

Returning to FIG. 1, in the stereo camera or the imaging system of the embodiment, the camera control unit 30 controls driving units 11a and 11b to acquire image data of a measurement object by the camera 1 (10a) and the camera 2 (10b). Then, the stereo camera calculates distance data between a measurement object and the camera based on parallax data obtained from two pieces of image data and performs three-dimensional measurement.

In addition, the stereo camera of the embodiment includes the calibration unit 40 for calculating camera parameters and the image recognition unit 50 for performing three-dimensional measurement and three-dimensional image processing. The calibration unit 40 and the image recognition unit 50 are connected to the camera 1 (10a) and the camera 2 (10b) via a communication path 20 and acquire image data from the camera 1 (10a) and the camera 2 (10b).

The processing result of the image recognition unit 50 can be displayed on a terminal device such as a liquid crystal display device (not illustrated) or a Cathode Ray Tube (CRT) display device. Furthermore, it may be configured to have the Red-Green-Blue (RGB) monitor output of the stereo camera of the embodiment or to output a data file via a network.

In addition, the stereo camera of the embodiment includes the camera setting value storage unit 60, the parameter initial value storage unit 61, and the correction data storage unit 62. As will be described in detail below, the calibration unit 40 performs camera calibration processing with reference to the camera setting value storage unit 60 and the parameter initial value storage unit 61 and the calibration unit 40 records correction data based on the calculated camera parameters in the correction data storage unit 62.

Then, with reference to the correction data storage unit 62, the image recognition unit 50 obtains the world coordinates of a measurement object from the image coordinates of the acquired image information of the camera and performs three-dimensional measurement and three-dimensional image processing. Specifically, the image recognition unit 50 acquires an image for processing by an image acquisition section 51 and a correction section 52 corrects image distortion and the like using the camera parameters acquired by the calibration unit 40, and then an image processing section 53 executes a parallax calculation of stereo processing or a processing of image analysis based on the corrected image.

Figure 2:
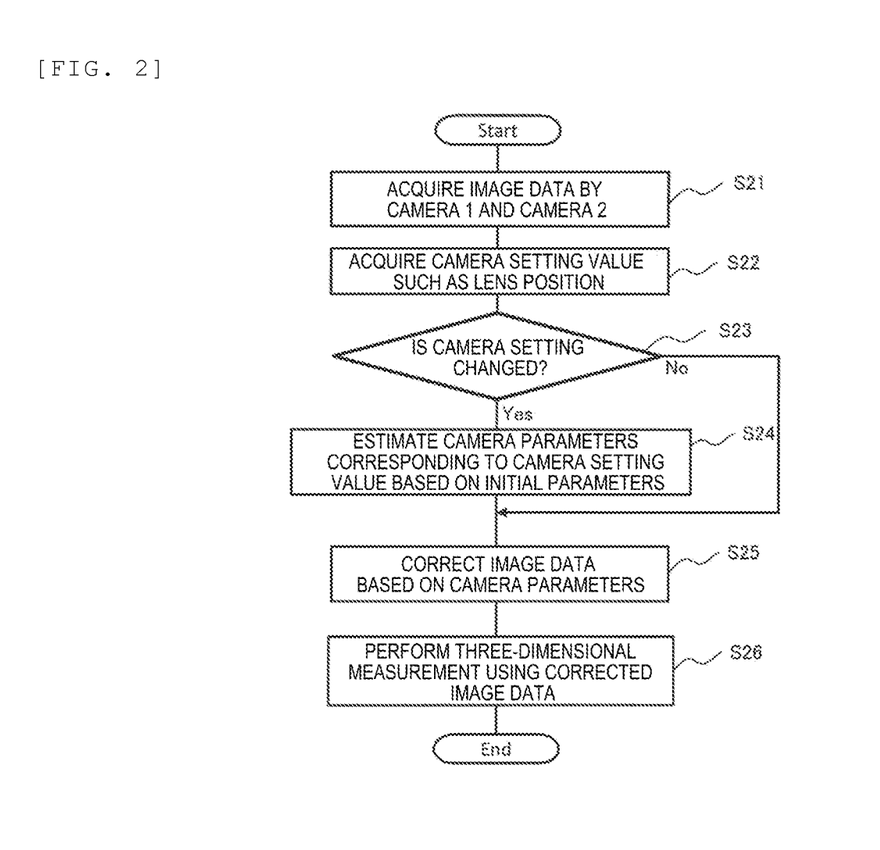
FIG. 2 is a diagram illustrating a processing outline of the stereo camera or an imaging system according to the embodiment.

Here, with reference to FIG. 2, an overview of processing of the stereo camera or the imaging system of the embodiment will be described. FIG. 2 is a flowchart illustrating the processing of one shot image data captured by two cameras of the camera 1 (10a) and the camera 2 (10b). When imaging is continuously performed, the flow of FIG. 2 is repeatedly processed.

First, image data captured by the camera 1 and the camera 2 is acquired (S21). Then, a camera setting value such as the lens position to which the operation is instructed is acquired (S22).

Next, it is determined whether the camera setting value is changed from the value at the time of the previous imaging processing (S23) and, when it is changed (Yes in S23), a calibration process for estimating the camera parameters is performed based on the initial parameters corresponding to the camera setting values (S24).

When the camera setting value is not changed in Step S23 (No in S23), the process proceeds to Step S25.

Here, a method of camera calibration in Step S24 is carried out by a method, such as [Q. T. Luong and O. D.Faugeras, "The Fundamental Matrix: Theory, Algorithms and Stability Analysis"], of extracting feature points and obtaining a basic matrix accordingly. Using the parameters acquired here, estimate values are evaluated using, for example, parallax density as an index. Then, until the evaluation value reaches a certain level or more, an iteration process may be performed by an arbitrary optimization method such as a gradient method, the Newton method, and the Levenberg-Marquardt method, and then the processing may be finished. The initial parameter is used as an initial value of the iteration process.

In this way, in Step S24, the stereo camera or the imaging system of the embodiment dynamically performs calibration in accordance with the change of the camera setting value according to the operation instruction of the camera 1 and the camera 2 and updates the camera parameters.

Therefore, even when the angle of view or the direction of the stereo camera is changed, the measurement accuracy does not fluctuate.

In addition, since the calibration is performed dynamically, it can follow changes due to aging of the stereo camera or the imaging system or external factors.

Furthermore, by adapting to dynamic calibration, measurement with less error can be performed even when the zoom range is widened, so the application range of the stereo camera or the imaging system can be expanded.

In Step S25, various correction processes such as lens distortion correction, magnification correction, and parallelization processing are performed on the image data using the acquired camera parameters.

In Step S26, a pre-process such as a low-pass filtering process for removing noise, a feature amount operation process such as an edge detection, a stereo matching process for acquiring parallax information by performing corresponding point searching between stereo images by using block matching such as normalized cross-correlation and difference absolute value sum or various correlation operation processing such as the space-sweep method, a post-process for removing singular points by rank-filter processing and labeling, or the like are performed on the image data and three-dimensional information of a subject is measured from the finally obtained parallax information using the camera information.

Figure 4:
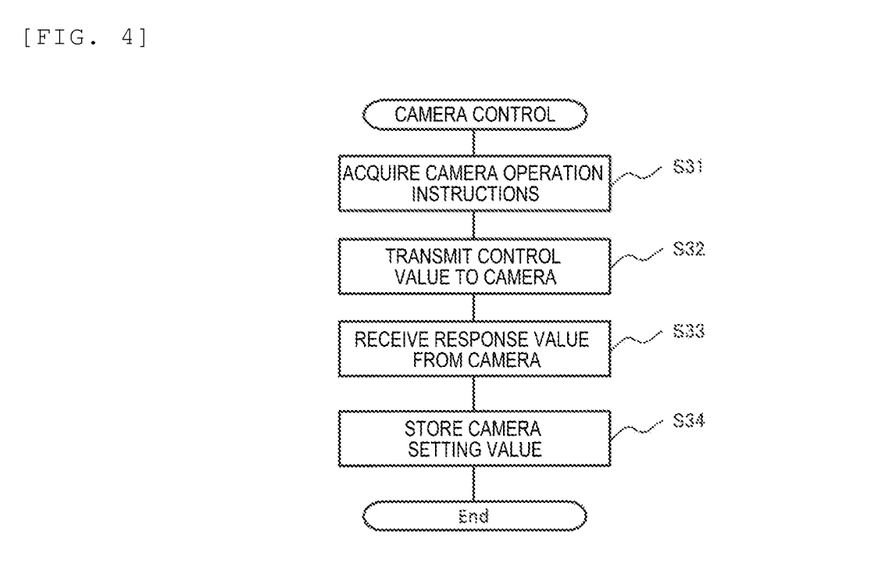
FIG. 4 is a diagram illustrating a processing flow of a camera control unit.

Next, the operation of the camera control unit 30 will be described in detail using a process flow of the camera control unit 30 in FIG. 4 with reference to an internal configuration diagram of the camera in FIG. 3.

First, the camera control unit 30 acquires camera operation instructions (lens moving amount, pan/tilt angle, and the like) such as the orientation and the angle of view of the camera 1 (10a) and the camera 2 (10b) of the stereo camera (S31). The camera operation instruction is set by operation setting of an adjusting mechanism of the stereo camera and an application program of a monitoring system or the like.

Then, a setting value of the tilt control section 202 of the driving unit 11, a setting value of the pan control section 203, and a control value of the zoom control section 201 which correspond to the operation instruction acquired in Step S31 are calculated and transmitted to the driving unit 11a and the driving unit 11b (S32).

Then, the camera control unit 30 receives a response value of the operation position such as an actually operated angle and a lens position from the driving unit 11a and the driving unit 11b of which the setting operation of the zoom control section 201, the tilt control section 202, and the pan control section 203 are finished (S33). This is to acquire the actual setting state on the camera side to improve the accuracy because, even when the control value is specified, there are errors such as the movement amount due to the variation or aging of the zoom mechanism or the pan/tilt mechanism of the camera.

Then, the received response value is recorded in the camera setting value storage unit 60 as data corresponding to external parameters of the camera 1 (10a) and the camera 2 (10b) of the stereo camera (S34).

Next, the calibration unit 40 of FIG. 1 for estimating camera parameters will be described.

As illustrated in FIG. 1, the calibration unit 40 is constituted of an image acquisition section 41 which acquires captured image information from the camera 1 (10a) and the camera 2 (10b) arranged so as to capture an imaging object from plural different directions, a data acquisition section 42 which acquires data of the camera setting value storage unit 60 and the parameter initial value storage unit 61, and a parameter estimation section 43 which estimates the camera parameters of the respective cameras of the camera 1 (10a) and the camera 2 (10b).

Figure 5:
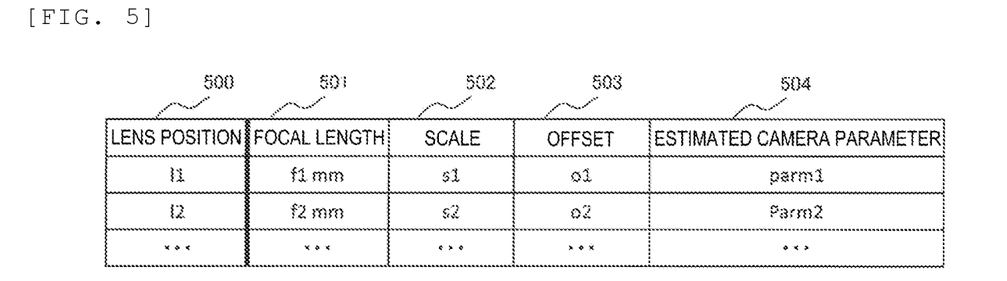
FIG. 5 is a diagram illustrating an example of a configuration of a parameter initial value.

In the parameter initial value 61, an initial value at the time of estimating a camera parameter by the parameter estimation section 43 is recorded. FIG. 5 illustrates an example of the configuration of the parameter initial value 61.

In the parameter initial value 61 of FIG. 5, initial values of the camera parameters are stored corresponding to predetermined camera setting values for each of the camera 1 (10a) and the camera 2 (10b) of the stereo camera. For example, a focal length 501 is given to a lens position 500, and in addition to that, an image scale 502, plural camera offsets 503, and the like are set.

Although details will be described later, camera parameters estimated by the calibration unit 40 are stored in the parameter initial value 61 in correspondence with the camera setting (lens position 500) (504). When there is no change in the camera setting, it is sufficient to refer to an estimated camera parameter 504 stored in the parameter initial value 61 without performing calibration.

When the camera setting is changed, a camera parameter corresponding to the camera setting at the previous imaging is acquired from the estimated camera parameter 504 of the parameter initial value 61 and this camera parameter is set as the initial value of the calibration. As a result, the estimation calculation can be stably performed.

Next, a process of correcting the image data based on the camera parameters in Step S25 of FIG. 2 will be described.

Figure 6:
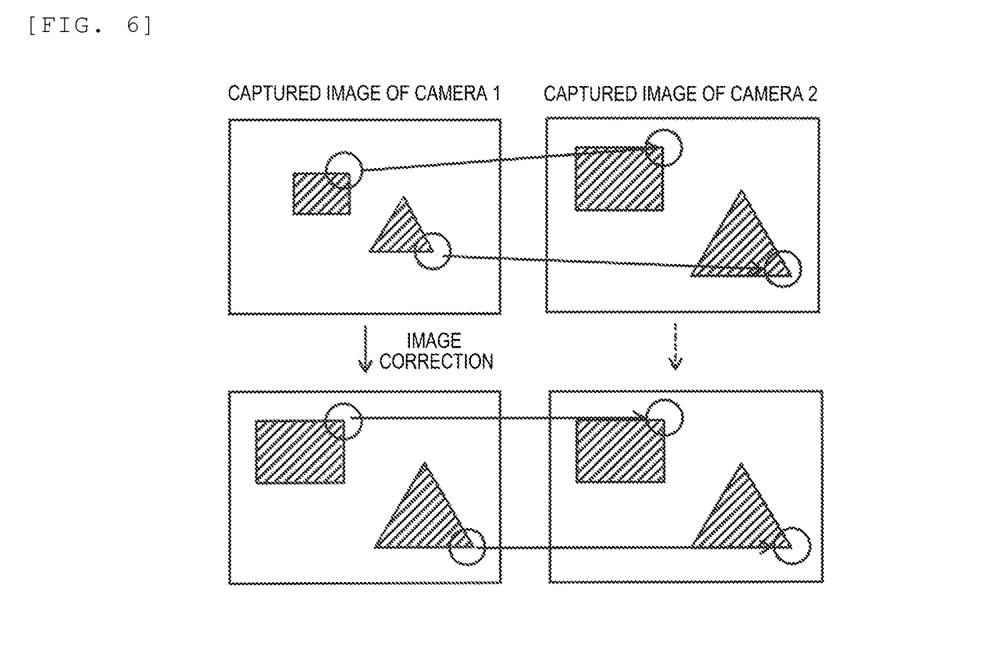
FIG. 6 is a diagram for explaining correction of image data of the stereo camera.

FIG. 6 is a diagram for explaining correction of image data of the stereo camera. In FIG. 6, the upper row illustrates captured images when the angle of view of camera 1 (10a) of stereo camera is larger than that of camera 2 (10b) and the lower row illustrates a case where the captured image of the camera 1 (10a) is corrected for collimation according to the angle of view of the camera 2 (10b).

In order to calculate the distance from the parallax information of the captured image of the stereo camera, it is necessary to obtain the parallax information when the angles of view of the camera 1 (10a) and the camera 2 (10b) are equal. The angles of view of the camera 1 (10a) and the camera 2 (10b) can be determined by comparing estimated camera parameters (focal lengths).

Therefore, in Step S25 of FIG. 2, when the estimated camera parameters (focal lengths) of the camera 1 (10a) and the camera 2 (10b) are compared and it is determined that the angles of view are different in the camera 1 (10a) and the camera 2 (10b), the other captured image is corrected in accordance with the angle of view of one captured image.

In the correction in this case, correlation of feature points in the same angle of view is performed by arbitrary feature point searching of captured images of the camera 1 (10a) and the camera 2 (10b) and parallelization correction of the captured images is performed so that epipolar lines of the feature points becomes parallel to each other.

In this case, the calculated correction data (correction matrix) is stored in the correction data 62 (see FIG. 1).

Next, in Step S26 of FIG. 2, parallax information is obtained using the image information of the camera 1 (10a) which is subjected to parallelization correction and the image information captured by the camera 2 (10b), and then three-dimensional restoration of the captured images of the camera 1 (10a) and the camera 2 (10b) is performed by executing the distance calculation from the parallax information or using the estimated camera parameters and the correction matrix subjected to parallelization correction.

Next, another calibration of the stereo camera or the imaging system of the embodiment will be described. The configuration of the stereo camera or the imaging system to be described is the same as that of FIG. 1, and thus the description thereof will not be repeated here.

In the stereo camera or the imaging system described above, the distance calculation and the three-dimensional restoration of the captured image are performed after the captured image information is corrected based on the estimated camera parameters. However, in the stereo camera or the imaging system described below, the evaluation index of the captured image is evaluated and the camera control values of the camera 1 (10a) and the camera 2 (10b) are changed so as to satisfy the predetermined evaluation value and then imaging is performed, and the distance calculation and the three-dimensional restoration of the captured image are performed.

With reference to the control flow of FIG. 7, the process of the embodiment will be described in detail.

First, image data captured by the camera 1 and the camera 2 is acquired (S71). Then, camera setting values such as the lens position subjected to operation instructions are acquired (S72).

Next, it is determined whether the camera setting value is changed from the value at the time of the previous imaging process (S73) and, when it is not changed (No in S73), the process proceeds to Step S81. In this case, three-dimensional restoration is performed based on the captured images of the camera 1 and the camera 2 using the camera parameters estimated in the previous imaging process (S81). The camera parameters can be acquired with reference to the initial parameters 61.

When the camera setting value is changed (Yes in S73), in order to calculate the parallax density of the captured image, the corresponding edge information is extracted in the image data of the camera 1 and the camera 2 (S74).

Then, the parallax density D with respect to the number of edge points E is determined as the following expression by using the number of effective parallaxes d representing the number of valid parallaxes with respect to the number of edge points, in such a manner that the parallax density D is calculated (S75).

$$D=d/E \qquad \text{(Expression 6)}$$

According to the parallax density D, it is possible to evaluate the accuracy of the correction parameter and the parallelization in stereo processing.

With regard to the parallax density, the evaluation value of the parallax density can be obtained by evaluating the actually measured value and the error of the distance data obtained from the acquired parallax image.

In addition, when deviation of a camera setting value or a camera parameter occurs, parallax information may not be obtained from the captured image in some cases. Also, when the captured image is not equal to or greater than a certain degree of matching, no parallax information can be obtained from the captured image. The evaluation by the parallax density D is based on the properties of those captured images.

In Step S76, the parallax density D is evaluated and, when the parallax density is equal to or greater than a predetermined value, the process proceeds to Step S80. That is, when the parallax density D is equal to or greater than a predetermined value, it is possible to acquire highly accurate parallax images and distance data from the captured images of the camera 1 and the camera 2 or it is determined that highly accurate three-dimensional restoration can be performed.

In Step S80, the camera parameters are estimated based on the captured images of the camera 1 and the camera 2. Estimation of the camera parameters in this case may be performed in the same manner as the calibration processing of Step S24 of the processing flow of FIG. 2. Also, the estimated camera parameters are recorded in the parameter initial value 61.

In Step S76, the parallax density D is evaluated and, when the parallax density is less than a predetermined value, a readjustment processing of the camera in the following Step S77 to Step S79 is performed.

In this readjustment processing of the camera, first, the camera setting value is corrected so as to increase the parallax density D (S77). In accordance with the camera control flow described in FIG. 4, the camera control unit 30 is notified of the corrected camera setting value as a camera operation instruction and the camera control value is transmitted from the camera control unit 30 to the camera 1 (10*a*) or the camera 2 (10*b*) (S78).

Next, the image data is acquired from the camera 1 (10*a*) and the camera 2 (10*b*) after the lens position, the pan/tilt angle, or the like, of the camera 1 (10*a*) or the camera 2 (10*b*) are corrected (S79), and then the process returns to Step S74.

In Step S76, until the parallax density D becomes equal to or greater than a predetermined value, the correction of the camera setting value and the evaluation of the parallax density D are repeated.

This makes it possible to acquire highly accurate parallax images from the captured images of the camera 1 and the camera 2, or to calculate highly accurate distance data or perform three-dimensional restoration.

It differs from the processing flow of FIG. 2 in that the calibration processing unit performs the adjustment of the camera via the camera control unit. A captured image with a high parallax density can be obtained by the processing flow of FIG. 2 and the accuracy of three-dimensional restoration can be enhanced.

Figure 8:
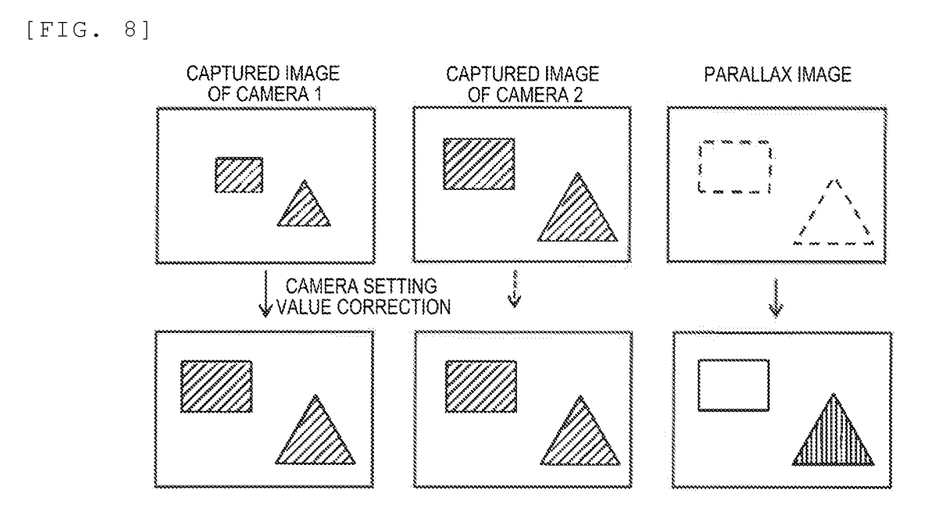
FIG. 8 is a diagram for explaining correction of the image data of the stereo camera by evaluation of parallax density.

FIG. 8 is a diagram for explaining captured images in a process of performing image-capturing by repeating the correction of the camera setting value and the evaluation of the parallax density D until the parallax density D becomes a predetermined value or more. The upper row of FIG. 8 illustrates captured images of the camera 1 (10*a*) and the camera 2 (10*b*) of the stereo camera before the correction of the camera setting value is performed and a parallax image obtained from the captured image. The degree of matching between the captured images of the camera 1 (10*a*) and the camera 2 (10*b*) of the stereo camera is small before the correction of the camera setting value is performed, and thus it is not possible to obtain an effective parallax image as represented by a broken line.

Figure 7:
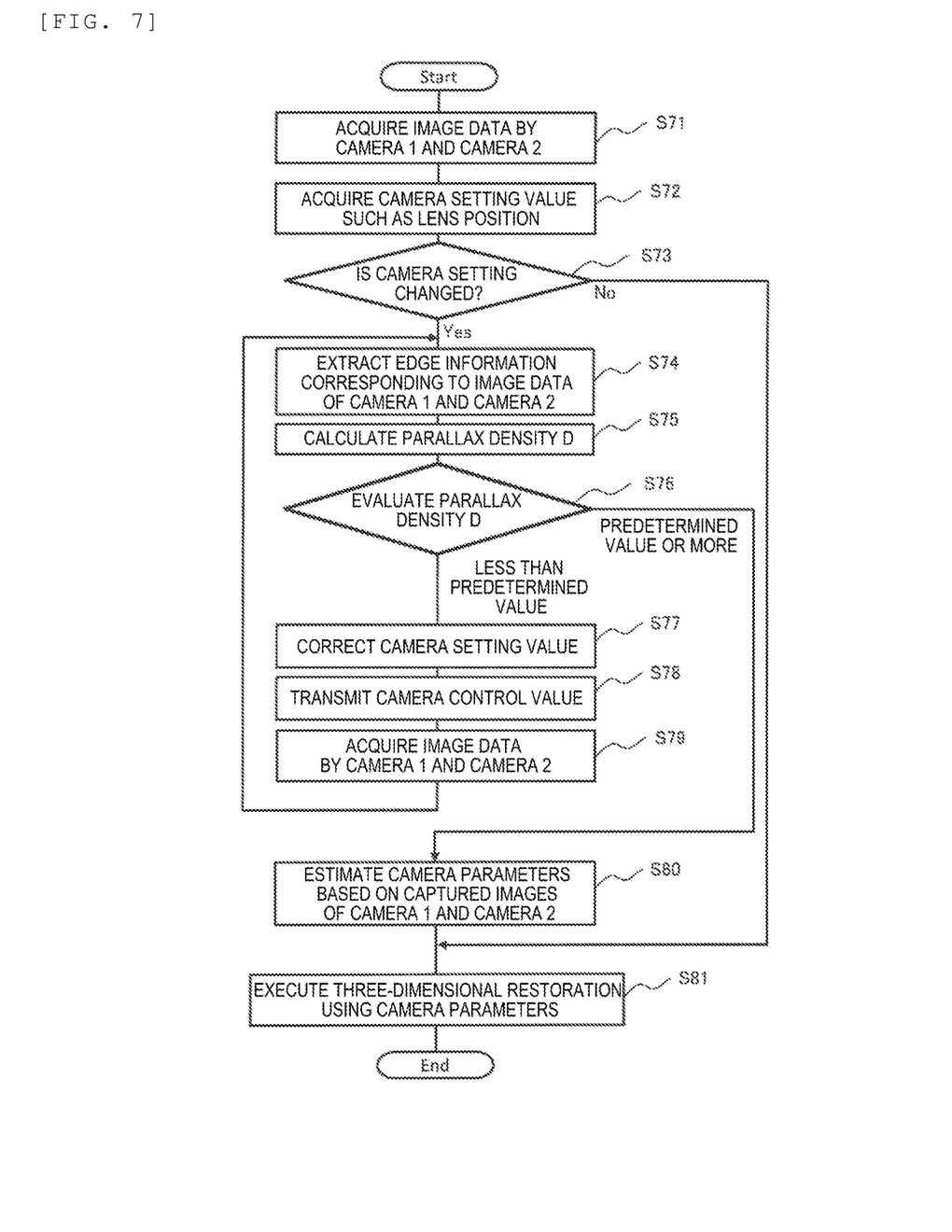
FIG. 7 is a control flow diagram of the stereo camera or the imaging system.

When the camera setting value of the camera 1 (10*a*) is corrected by the processing flow described in FIG. 7, the captured image of the camera 1 (10*a*) changes, so that a parallax image of captured images of the camera 1 (10*a*) and the camera 2 (10*b*) can be obtained, as illustrated in the lower row of FIG. 8.

In FIG. 8, the captured image of the camera 1 (10*a*) is changed by correcting the camera setting value, but the camera setting value of the camera 2 (10*b*) may be corrected. Also, the camera setting values of both camera 1 (10*a*) and camera 2 (10*b*) may be corrected.

Generally, in the process of the stereo camera, processing by parallelization stereo is performed in consideration of operation resources of hardware. For example, in the processing flow of FIG. 2, it is shown that the parallelization correction is performed in Step S25.

However, the invention is not limited to the processing described above, but requires operation resources. However, when the camera setting value is changed and calibration is performed, parallax calculation by arbitrary directional feature point searching may be performed.

Figure 9:
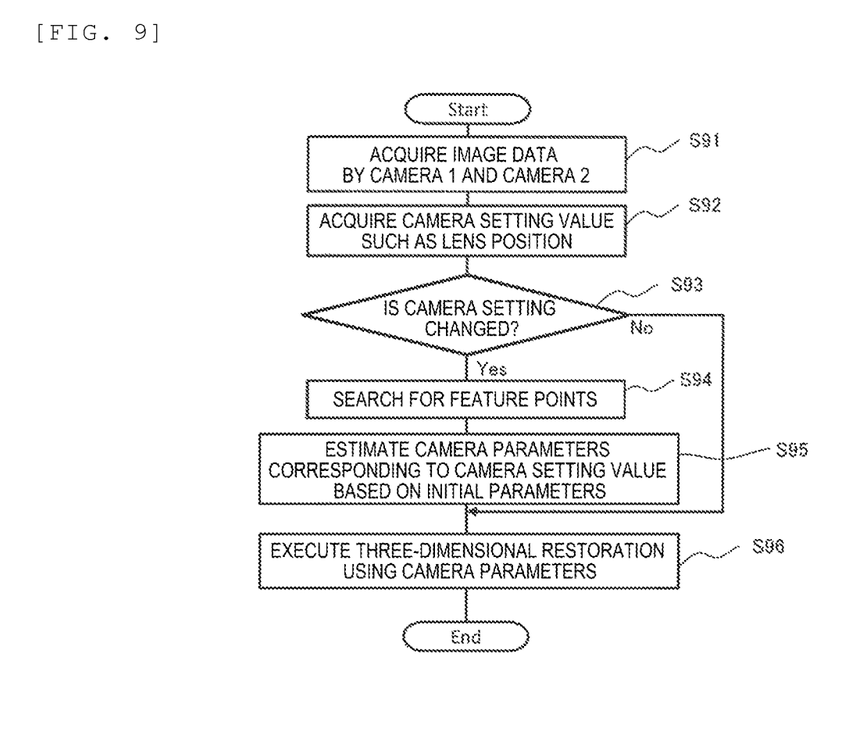
FIG. 9 is a diagram illustrating a processing flow when calibration is performed by searching for feature points in an arbitrary direction.

FIG. 9 illustrates a processing flow when calibration is performed by searching for feature points in an arbitrary direction.

First, image data captured by the camera 1 and the camera 2 is acquired (S91). Then, camera setting values such as the lens position are acquired (S92).

Next, it is determined whether the camera setting value is changed from the value at the time of the previous imaging processing (S93) and, when it is not changed (No in S93), the process proceeds to Step S96. In this case, three-dimensional restoration is performed based on the captured images of the camera 1 and the camera 2 using the camera parameters estimated in the previous imaging processing (S96). The camera parameters are acquired with reference to the initial parameter 61.

When the camera setting value is changed (Yes in S93), feature points are searched by comparing the captured images of the camera 1 and the camera 2 (S94). In this case, searching is performed in a predetermined width in the horizontal direction or the entire screen instead of searching only in the horizontal direction, in such a manner that feature points to be matched between the two captured images are searched.

Then, a calibration process for estimating the camera parameters is performed based on the initial parameters corresponding to the camera setting values (S95). This calibration process is performed in the same manner as the process of Step S24 of FIG. 2.

Then, in Step S96, three-dimensional restoration is performed based on the captured images of the camera 1 and the camera 2, using the camera parameters estimated in the previous imaging processing or the camera parameters estimated in Step S95.

Figure 10:
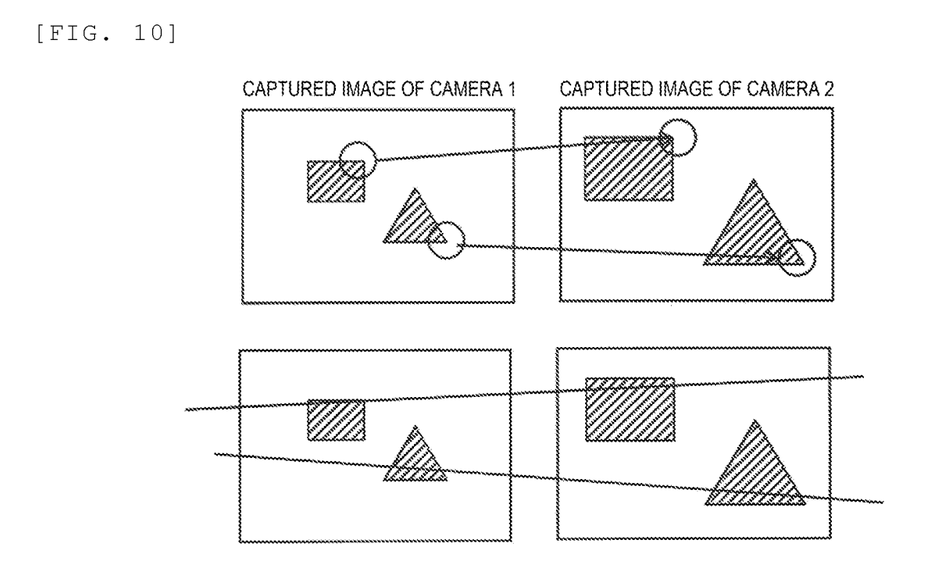
FIG. 10 is a diagram illustrating a feature point searching state of a captured image.

FIG. 10 is a diagram illustrating a feature point searching state of the captured images of the camera 1 and the camera 2. The processing of parallelization stereo is not performed, and thus the search direction is inclined as illustrated in the lower row of the diagram.

Next, an example of a structure of a stereo camera which is particularly useful for the calibration control method of the embodiment will be described with reference to FIG. 11.

In a general stereo camera, in many cases, the right-left-camera positional relationship between the camera 1 and the camera 2 is set side by side so that the optical axes of the cameras are arranged in a state of parallel equiphase in which the optical axes of the cameras are fixed and arranged at the same height in a parallel state. Further, in many cases, it has a structure in which the camera 1 and the camera 2 are rotatably supported at the center of the camera 1 and the camera 2 and, when the stereo camera is panned to the right side or the left side, the camera 1 and the camera 2 rotate at the center of the camera 1 and the camera 2 as a single body.

In the structure described above, an area for rotating the camera 1 and the camera 2 is required, so there is a problem in downsizing the stereo camera. In particular, when the distance between the camera 1 and the camera 2 is increased to improve the measurement accuracy, a large rotation area is required.

Figure 11:
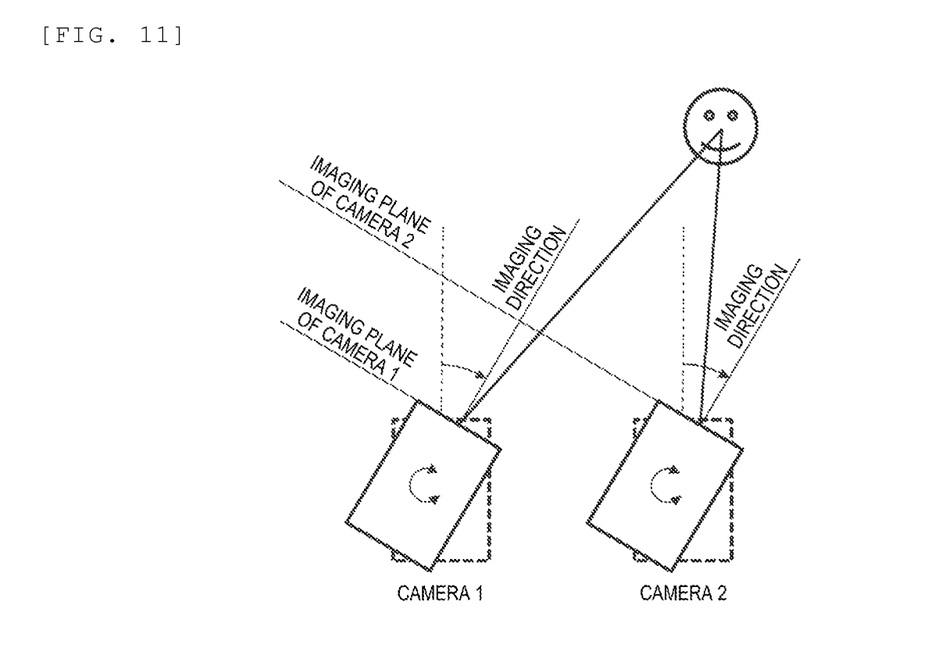
FIG. 11 is a diagram illustrating an example of the structure of the stereo camera.

In the stereo camera of the embodiment, as illustrated in FIG. 11, each of the camera 1 and the camera 2 is configured to independently rotate with the camera as a center. This makes it possible to reduce the rotation area of the camera and to reduce the size of the stereo camera.

When the camera 1 and the camera 2 according to the embodiment face the front, imaging planes of the camera 1 and the camera 2 are on the same plane and are in a state of parallel equiphase. However, as illustrated in FIG. 11, when the camera 1 and the camera 2 are rotated by a predetermined angle from a facing direction, the imaging plane of the camera 1 and the imaging plane of the camera 2 are not formed on the same plane. Therefore, it does not become a state of parallel equiphase and the angle of view of the camera 1 differs from that of the camera 2, and thus effective parallax information cannot be acquired.

In this case, in the stereo camera of the embodiment, the camera 1 or the camera 2 is calibrated by performing zoom control so that the angle of view of the camera 1 and the angle of view of the camera 2 become the same when the imaging direction (camera setting) changes. As a result, the camera 1 and the camera 2 can be regarded as states of the parallel equiphase camera, so that distance information can be acquired and three-dimensional restoration can be performed regardless of the rotation direction of the camera 1 and the camera 2.

Further, the invention is not limited to the embodiment described above, but includes various modification examples. The embodiment described above is described in detail for easy understanding by the invention and it is not necessarily limited to those having all the configurations described. In addition, it is possible to replace part of the configuration of one embodiment with the configuration of another embodiment and it is also possible to add configurations of a certain embodiment to the configuration of other embodiments.

REFERENCE SIGNS LIST

10a: Camera 1
10b: Camera 2
11a, 11b: Driving Unit
12a, 12b: Imaging Unit
30: Camera Control Unit
40: Calibration Unit
41: Image Acquisition Section
42: Data Acquisition Section
43: Parameter Estimation Section
50: Image Recognition Unit
51: Image Acquisition Section
52: Correction Section
53: Image Processing Section
60: Camera Setting Value Storage Unit
61: Parameter Initial Value Storage Unit
62: Correction Data Storage Unit

The invention claimed is:

1. A stereo camera comprising:
at least two cameras;
a calibration unit configured to estimate camera parameters of the stereo camera when a lens position of the stereo camera is changed by an operation instruction of the stereo camera; and
a camera control unit configured to change the lens position of the stereo camera so that a parallax density calculated from each captured image of the cameras and being a ratio of a number of effective parallaxes to a number of edge points is equal to or greater than a predetermined value, thereby acquiring a captured image of the stereo camera.

2. The stereo camera according to claim 1, wherein
feature points of each captured image of the at least two cameras are searched and the camera parameters are estimated based on a position coordinate of the searched feature points.

3. The stereo camera according to claim 2, wherein
the captured image is corrected so that epipolar lines of the feature points between the respective captured images of the at least two cameras become parallel.

4. The stereo camera according to claim 2, wherein
the camera parameters are estimated by performing an iteration process based on the camera parameters at a time of a previous imaging.

5. The stereo camera according to claim 1, wherein
the captured image is corrected so that epipolar lines of the feature points between the respective captured images of the at least two cameras become parallel.

6. The stereo camera according to claim 1, wherein
the camera parameters are estimated by performing an iteration process based on the camera parameters at a time of a previous imaging.

7. The stereo camera according to claim 1, wherein
when the lens position of the stereo camera is changed by an operation instruction of the stereo camera, an actual lens position is responded from the stereo camera and camera parameters are estimated based on a response value from the stereo camera.

8. The stereo camera according to claim 1, wherein each of the at least two cameras is installed so as to pivot on a center of the stereo camera, and camera parameters are estimated when the stereo camera is subjected to pan control.

9. An imaging system, comprising:

at least two cameras;

a camera control unit which controls at least a lens position of both of the at least two cameras;

a calibration unit which estimates camera parameters of the at least two cameras when at least the lens position of the at least two cameras is moved by the camera control unit; and an image recognition unit which performs three-dimensional restoration of captured images of the at least two cameras based on the camera parameters;

wherein the calibration unit changes the lens position of the at least two cameras so that a parallax density calculated from each captured image of the at least two cameras and being a ratio of a number of effective parallaxes to a number of edge points is equal to or greater than a predetermined value, thereby acquiring a captured image of the at least two cameras.

10. The imaging system according to claim 9, wherein the calibration unit searches for feature points of respective captured images of the at least two cameras and estimates the camera parameters based on position coordinates of the searched feature points.

11. The imaging system according to claim 10, wherein the image recognition unit corrects the captured image so that epipolar lines of feature points between respective captured images of the at least two cameras become parallel.

12. The imaging system according to claim 10, wherein a parameter initial value storage unit for storing camera parameters at a time of a previous imaging for each camera setting value is provided, and the calibration unit performs estimation processing with the camera parameter of the parameter initial value storage unit as an initial value.

13. The imaging system according to claim 9, wherein the image recognition unit corrects the captured image so that epipolar lines of feature points between respective captured images of the at least two cameras become parallel.

14. The imaging system according to claim 9, wherein a parameter initial value storage unit for storing camera parameters at a time of a previous imaging for each camera setting value is provided, and the calibration unit performs estimation processing with the camera parameter of the parameter initial value storage unit as an initial value.

15. The imaging system according to claim 9, wherein an actual lens position is responded from the at least two cameras when the lens position of the at least two cameras is changed and a camera setting value storage unit for storing a response value from the at least two cameras is provided, and the calibration unit estimates camera parameters based on the lens position stored in the camera setting value storage unit.

* * * * *